United States Patent [19]
Tanaka et al.

[11] 3,979,365
[45] Sept. 7, 1976

[54] PROCESS FOR PRODUCING THERMOSETTING RESINS

[75] Inventors: Goro Tanaka; Shinichi Toyoda; Toshikazu Narahara, all of Hitachi, Japan

[73] Assignee: Hitachi, Ltd., Japan

[22] Filed: Aug. 28, 1974

[21] Appl. No.: 501,363

[30] Foreign Application Priority Data
Aug. 31, 1973  Japan .............................. 48-97142

[52] U.S. Cl. .................... 260/77.5 NC; 260/77.5 R; 260/830 P
[51] Int. Cl.² ................. C08G 18/00; C08G 18/18; C08G 18/20; C08G 18/22
[58] Field of Search ............... 260/77.5 R, 77.5 NC, 260/830 P

[56] References Cited
UNITED STATES PATENTS

| | | | |
|---|---|---|---|
| 3,020,262 | 2/1962 | Speranza | 260/47 |
| 3,494,888 | 2/1970 | McElroy | 260/77.5 NC |
| 3,694,406 | 9/1972 | D'Alelio | 260/77.5 NC |
| 3,721,650 | 3/1973 | D'Alelio | 260/77.5 R |
| 3,793,236 | 2/1974 | Ashida et al. | 260/77.5 NC |
| 3,817,938 | 6/1974 | Ashida et al. | 260/77.5 NC |

OTHER PUBLICATIONS

Herweh et al. Tetrahedron Letters No. 12, pp. 809–812 (1971).

*Primary Examiner*—H.S. Cockeram
*Attorney, Agent, or Firm*—Craig & Antonelli

[57] ABSTRACT

Thermosetting resins are produced by blending 1 equivalent of a polyoxazolidone terminated by two vicinal epoxy groups and containing at least two oxazolidone rings with at least 1 equivalent of a polyfunctional isocyanate compound, adding 0.01 to 10% by weight of a catalyst which forms isocyanurate rings and oxazolidone rings based on the total amount of the polyoxazolidone and the isocyanate compound, and then heating the resulting composition to polymerize the composition by forming isocyanurate rings and oxazolidone rings. The resin compositions have excellent mechanical properties, and particularly excellent flexibility, and excellent thermal resistance.

19 Claims, No Drawings

PROCESS FOR PRODUCING THERMOSETTING RESINS

The present invention relates to a process for producing thermosetting resins. More particularly, the invention pertains to a process for producing thermosetting resins which comprises mixing 1 equivalent of a polyoxazolidone terminated by two vicinal epoxy groups with at least 1 equivalent of a polyfunctional isocyanate compound and then reacting the mixture in the presence of a catalyst which forms isocyanurate rings and oxazolidone rings to polymerize the mixture by forming isocyanurate rings and oxazolidone rings.

When 1 equivalent of a polyfunctional epoxy compound is reacted with at least 1 equivalent of a polyfunctional isocyanate compound in the presence of a catalyst which forms isocyanurate rings and oxazolidone rings, a resin in which isocyanurate rings formed by trimerization of the isocyanate compound and oxazolidone rings formed by the reaction of the epoxy compound and the isocyanate compound are contained as a recurring unit represented by the formula,

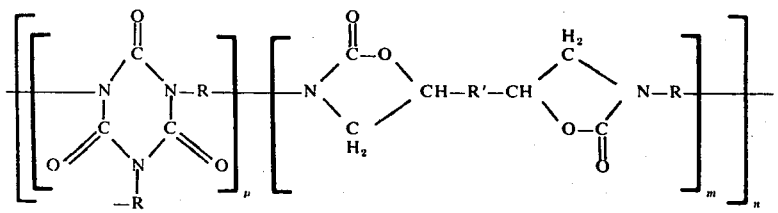

(1)

wherein $p$, $m$ and $n$ are integers of at least 1, is obtained.

Such a resin has excellent thermal resistance (H class, 180°C) and excellent mechanical properties, but is lacking in flexibility.

When said epoxy compound is mixed with said isocyanate compound and the mixture is reacted in the presence of said catalyst, trimerization of isocyanate group precedes the reaction between epoxy group and isocyanate group. Therefore, the density of isocyanurate ring increases and crosslinking density increases, and the cured resin is generally hard and is lacking in flexibility. Thereby, the resin cannot be used in films and coating films which require flexibility.

An object of the present invention is to provide thermosetting resins having excellent thermal resistance.

Another object of the invention is to provide thermosetting resins having excellent mechanical properties, and particularly excellent flexibility, and excellent thermal resistance.

Other objects will be apparent from the following description.

The present inventors considered that crosslinking density as a whole can be reduced and thereby excellent flexibility can be obtained if a long chain can be formed in the non-crosslinked part before trimerization of the isocyanate occurs.

According to the present invention, a thermosetting resin containing recurring units represented by the formula,

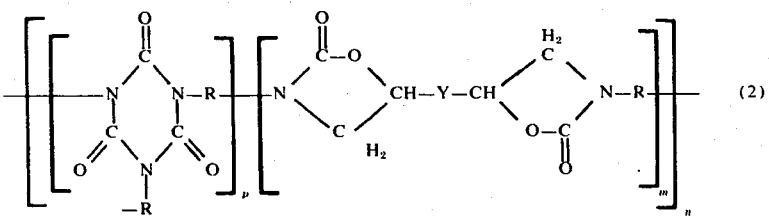

(2)

wherein R is an isocyanate residue, $p$, $m$ and $n$ are integers of at least 1, and Y is

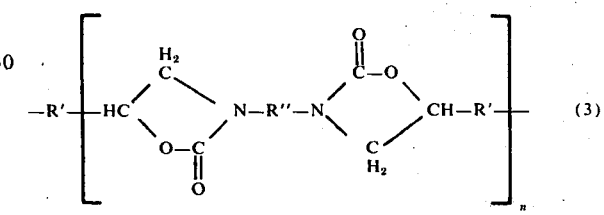

(3)

wherein R' is an epoxy residue of a diepoxide, R'' is an isocyanate residue of a diisocyanate, and $n$ is an integer of at least 1, is produced by mixing 1 equivalent of a polyoxazolidone terminated by two vicinal epoxy groups and having at least two oxazolidone rings with at least 1 equivalent of a polyfunctional isocyanate compound and then reacting the mixture in the presence of a catalyst which forms isocyanurate rings and oxazolidone rings to polymerize the mixture by forming isocyanurate rings and oxazolidone rings.

The term "polyoxazolidone" used herein means a prepolymer terminated by an epoxy group which is obtained by reacting 1 equivalent of a diepoxide with less than 1 equivalent of a diisocyanate in the presence of an oxazolidone ring forming catalyst (See formula (4)).

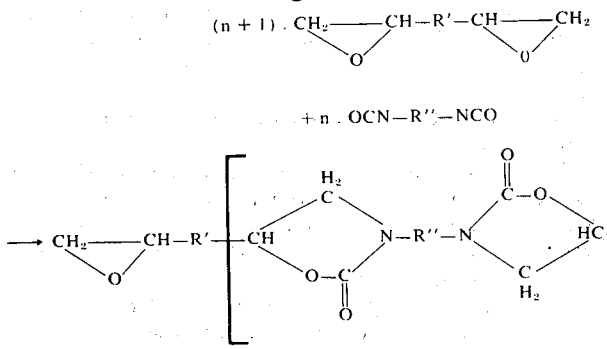

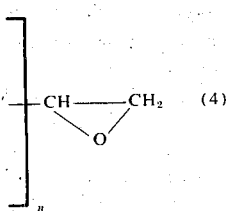

(4)

wherein R' is an epoxy residue of the epoxide, R'' is an isocyanate residue of the diisocyanate, and n is an integer of at least 1.

As the diepoxide, diglycidylether of bisphenol A, diglycidylether of diphenol, diglycidylethers of glycols and diglycidylesters of dicarboxylic acids as well as unsaturated compounds epoxidized by a peroxide such as vinylcyclohexene dioxide, dicyclopentadiene dioxide and 3,4-epoxycyclohexanecarboxylate may be used.

As the diisocyanate, tolylene diisocyanate, diphenylmethane diisocyanate, phenylene diisocyanate, naphthalene diisocyanate, dianisidine diisocyanate, toluidine diisocyanate, hexamethylene diisocyanate, xylene diisocyanate and vinylene diisocyanate as well as hydrogenation products of the above-mentioned diisocyanates and diisocyanates obtained by masking part or all of isocyanate groups by, for example, a phenol compound may be used.

As the oxazolidone ring forming catalyst, pyridine, lithium chloride, lithium bromide-phosphine oxide adduct, lithium butoxide and quaternary ammonium salts having a lower alkyl groups of up to 4 carbon atoms may be used.

The number of oxazolidone rings in the abovementioned polyoxazolidone is desirably up to 50 from the viewpoints of compatibility with said isocyanate when reacted with the isocyanate, solubility in a solvent and workability.

It is also desirable that said oxazolidone ring forming catalyst is added in an amount of 0.1 to 10 parts by weight per 100 parts by weight of a mixture of the diepoxide and the diisocyanate. The reaction is effected at 100°–200°C for about 0.1 to about 10 hours to yield a polyoxazolidone terminated by two vicinal epoxy groups.

In the above-mentioned reaction, a solvent may be used if necessary. As the solvent, dimethylformamide, dimethylacetamide, dimethylsulfoxide, N-methylpyrrolidone, dichlorobenzene, cresol, anisol, phenetole, diphenyl ether, cyclohexanone, methyl benzoate and diethylene glycol dimethyl ether may be used.

When said polyoxazolidone is reacted with a polyfunctional isocyanate compound in the presence of a catalyst which forms isocyanurate rings and oxazolidone rings, isocyanurate rings and oxazolidone rings are formed to effect polymerization and curing. Here, it is necessary to mix at least 1 equivalent of the polyfunctional isocyanate compound with 1 equivalent of the polyoxazolidone. If the amount of the isocyanate compound exceeds 20 equivalents, the resulting cured product tends to become remarkably brittle. The amount of the isocyanate compound is preferably within a range of 1 to 10 equivalents to obtain a thermal resistance of 180°C or more and excellent flexibility.

As polyfunctional isocyanates to be reacted with the polyoxazolidone, there can be used bifunctional isocyanates, such as, for example, methane diisocyanate, butane-1,1-diisocyanate, ethane-1,2-diisocyanate, butane-1,2-diisocyanate, transvinylene diisocyanate, propane-1,3-diisocyanate, butane-1,4-diisocyanate, 2-butene-1,4-diisocyanate, 2-methylbutane-1,4-diisocyanate, pentane-1,5-diisocyanate, 2,2-dimethyl-pentane-1,5-diisocyanate, hexane-1,6-diisocyanate, heptane-1,7-diisocyanate, octane-1,8-diisocyanate, nonane-1,9-diisocyanate, decane-1,10-diisocyanate, dimethylsilane diisocyanate, diphenylsilane diisocyanate, $\omega,\omega'$-1,3-dimethylbenzene diisocyanate, $\omega,\omega'$-1,4-dimethylbenzene diisocyanate, $\omega,\omega'$-1,3-dimethylcyclohexane diisocyanate, $\omega,\omega'$-1,4-dimethylcyclohexane diisocyanate, $\omega,\omega'$-1,4-dimethylbenzene diisocyanate, $\omega,\omega'$-1,4-dimethylnaphthalene diisocyanate, $\omega,\omega'$-1,5-dimethylnaphthalene diisocyanate, cyclohexane-1,3-diisocyanate, cyclohexane-1,4-diisocyanate, dicyclohexylmethane-4,4'-diisocyanate, 1,3-phenylene diisocyanate, 1,4-phenylene diisocyanate, 1-methylbenzene-2,4-diisocyanate, 1-methylbenzene-2,5-diisocyanate, 1-methylbenzene-2,6-diisocyanate, 1-methylbenzene-3,5-diisocyanate, diphenylether-4,4'-diisocyanate, diphenylether-2,4'-diisocyanate, naphthalene-1,4-diisocyanate, naphthalene-1,5-diisocyanate, biphenyl-4,4'-diisocyanate, 3,3'-dimethylbiphenyl-4,4'-diisocyanate, 2,3'-dimethoxybiphenyl-4,4'-diisocyanate, diphenylmethane-4,4'-diisocyanate, 3,3'-dimethoxydiphenylmethane-4,4'-diisocyanate, 4,4'-dimethoxydiphenylmethane-3,3'-diisocyanate, diphenylsulfide-4,4'-diisocyanate, diphenylsulfone-4,4'-diisocyanate and the like; and tri- or more-functional isocyanates, such as, for example, polymethylenepolyphenylisocyanate, triphenylmethanetriisocyanate, tris(4-phenylisocyanatethiophosphate), 3,3',4,4'-diphenylmethanetetraisocyanate and the like. Further, compounds obtained by masking isocyanic radicals of the aforesaid isocyanates with phenol, cresol and the like can be used, too. The dimers and trimers of these isocyanates are usable, too. Among these isocyanates, 4,4'-diphenylmethane diisocyanate, 2,4-toluene diisocyanate, naphthalene-3,5-diisocyanate are preferable and useful. The aforesaid isocyanates are each used solely or in combination with one another.

The catalyst which forms isocyanurate rings and oxazolidone rings plays an important role in the reaction between said polyoxazolidone and said polyfunctional isocyanate compound according to the present invention. Such a catalyst as above includes tertiary amines, such as, for example, trimethylamine, triethylamine, tetramethylbutanediamine, tetramethylpentanediamine, tetramethylhexanediamine, triethylene diamine and the like; oxyalkylamine, such as, for example, dimethylaminoethanol, dimethylaminopentanol and the like; and morpholine derivatives, such as, for example, N-allyldodecyl morpholine, butylene dimorpholine, hexamethylene dimorpholine, cyanoethyl morpholine, triazinoethyl morpholine, N-methyl morpholine, N-ethyl morpholine and the like. Further, there are quaternary ammonium salts containing a long chain alkyl group having 8 or more carbon atoms as a catalyst, such as, for example, cetyltrimethylammonium bromide, cetyltrimethylammonium chloride, dodecyltrimethylammonium iodide, trimethyldodecylammonium chloride, benzyldimethyltetradecylammonium chloride, benzyldimethyltetradecylammonium chloride, benzyldimethylpalmitylammonium chloride, allylcoconuttrimethylammonium bromide, benzyldimethylstearylammonium bromide, stearyltrimethylammonium chloride, benzyldimethyltetradecylammonium acetylate and the like. Furthermore, there are imidazoles as a catalyst, such as, for example, 2-methylimidazole, 2-ethylimidazole, 2-undecylimidazole, 2-heptadecylimidazole, 2-methyl-4-ethylimidazole, 1-butylimidazole, 1-propyl-2-methylimidazole, 1-benzyl-2-methylimidazole, 1-cyanoethyl-2-methylimidazole, 1-cyanoethyl-2-undecylimidazole, 1-cyanoethyl-2-phenylimidazole, 2,4-diamino-6-(2'-methylimidazolyl-1'-)-ethyl-s-triazine, 2,4-diamino-6-(2'-ethylimidazolyl-1'-)-ethyl-s-triazine, 2,4-diamino-6-(2'-undecylimidazolyl-1'-)-ethyl-2-triazine and the like. Among the aforesaid catalysts, morpholine derivatives or imidazole derivatives are particularly effective.

The above-mentioned catalyst which forms isocyanurate rings and oxazolidone rings may be used in an amount of 0.01 to 10% by weight, and preferably 0.1 to 2.0% by weight, based on the weight of said resin components.

A cured resin is obtained by mixing the abovementioned polyoxazolidone, polyfunctional isocyanate and catalyst which forms isocyanurate rings and oxazolidone rings and then heating the mixture to 80°–400°C. The time required for curing depends upon the blending ratio and the temperature used.

Also, in the present invention, a usual epoxy resin may be used together with said polyoxazolidone if necessary. Further, a filler, a pigment, etc. which are generally used may be added.

The thermosetting resins obtained by the present invention are suitable for an insulating varnish, a coating varnish for magnet wire, the other electric insulating materials, a paint, an adhesive, etc. in which thermal resistance is required.

The following referential examples illustrate the production of the polyoxazolidone.

Referential Example 1

In a 1 l flask equipped with a thermometer, a stirrer, a gas inlet tube, a reflux condenser and a dropping funnel, 174 g (0.5 mole) of diglycidylether of bisphenol A (DER-332 manufactured by Dow Chemical Corp. in U.S.A., epoxy equivalent 174) and 275 g of o-dichlorobenzene were mixed. Thereto was added 2.5 ml of a solution of lithium butoxide in butyl alcohol having a concentration of 0.2 mole/liter and the mixture was heated to 170°C in an oil bath while nitrogen gas was introduced. A solution of 112.5 g (0.45 mole) of 4,4'-diphenylmethane-diisocyanate (MDI manufactured by Nippon Polyurethane Co. in Japan) in 112 g of o-dichlorobenzene was dropped slowly through a dropping funnel with stirring. Dropping was completed in one hour and 40 minutes and the reaction was continued at 170°C for 2 hours. The reaction was stopped by cooling the reaction mixture to room temperature. Thus, a viscous composition which had a viscosity of about 60 poises at room temperature was obtained. The infrared absorption spectrum of the reaction product showed that an absorption at 2280 cm$^{-1}$ due to an isocyanate group which had been present in the starting materials disappeared and a new absorption appeared at 1750 cm$^{-1}$ showing the formation of an oxazolidone bond. Also, an absorption at 918 cm$^{-1}$ due to an epoxy group which had been present in the starting materials was present in the reaction product, showing that the epoxy group remained. A cured product which is the objective product of the present invention was obtained by adding an isocyanate compound and a catalyst and heating the mixture.

To the above-mentioned reaction product was added 3% of a boron trifluoride-monoethylamine complex which is conventionally used as a curing catalyst for epoxy resins, and the mixture was heated at 180°C for 1 hour to obtain a cured product having a heat distortion temperature of 220°C. A cured product obtained by curing an usual epoxy resin (DER-332) in the same manner showed a heat distortion temperature of 153°C.

Referential Example 2

Into a 300 ml flask equipped with a thermometer, a gas inlet tube and a stirrer were charged 87 g (0.25 mole) of DER-332 and 31.25 g (0.125 mole) of MDI. The mixture was heated to 170°C with stirring while nitrogen gas was passed through the reaction mixture. Thereto was added 0.3 ml of a solution of lithium butoxide in butyl alcohol having a concentration of 0.2 mole/liter. The temperature of the reaction mixture increased to 225°C due to the exothermic reaction, and a liquid of a high viscosity was formed. Immediately heating was stopped and the reaction mixture was allowed to cool to room temperature. Thus, a yellow solid was obtained.

The infrared absorption spectrum of the product showed that an absorption at 2280 cm$^{-1}$ due to an isocyanate group which had been present in the starting materials disappeared and a new absorption appeared at 1750 cm$^{-1}$ showing the formation of an oxazolidone group. Also, a slight absorption appeared at 1700 cm$^{-1}$ showing the formation of a small amount of an isocyanurate bond. The absorption of an epoxy group at 918 cm$^{-1}$ remained. The reaction product was insoluble in toluene (Both DER-332 and MDI are soluble in toluene), but was readily soluble in cyclohexanone.

Referential Example 3

Into a 300 ml flask equipped with a thermometer, a gas inlet tube and a stirrer were charged 87 g (0.25 mole) of DER-332 and 31.25 g (0.125 mole) of MDI. The mixture was stirred and heated to 170°C while nitrogen gas was passed through the mixture. Thereto was added 1.18 g of benzalkonium chloride. The temperature of the reaction mixture increased to 215°C owing to the exothermic reaction and a product having a high viscosity was obtained. The reaction was continued at 170°C for 2 hours and the reaction mixture was cooled to room temperature to yield a reddish yellow solid. The infrared absorption spectrum of the reaction product was substantially the same as that of the reaction product of Referential Example 2. The reaction product of this Referential Example was insoluble in toluene, but was soluble in cyclohexanone.

Referential Example 4

34.8 Grams (0.1 mole) of DER-332 and 2.5 g (0.01 mole) of MDI and 0.04 g of benzalkonium chloride were charged into a 100 ml flask. The mixture was heated to 180°C with stirring. Heating was continued for 1 hour to yield a liquid having a high viscosity. The infrared absorption spectrum of the reaction product showed that the absorption of an isocyanate group (2280 cm$^{-1}$) disappeared and a new absorption of oxazolidone (1750 cm$^{-1}$) appeared. The reaction product was insoluble in toluene, but was soluble in xylene.

Referential Example 5

Into a 100 ml flask equipped with a thermometer, a dropping funnel, a gas inlet tube, a stirrer and a reflux condenser were charged 30 g of dimethylformamide and 0.15 g of tetraethylammonium chloride. The mixture was heated to 150°C. While nitrogen gas was passed through the reaction mixture, the mixture was stirred and a mixture of 8.55 g (0.049 mole) of tolylene diisocyanate (TDI-80 manufactured by Nippon Urethane Co., in Japan) and 21.4 g (0.05 mole) of a diepoxide of methylglycidylether of bisphenol A type (MH-8 manufactured by Dai Nippon Ink & Chemicals Inc. in Japan) was dropped through the dropping funnel. After the completion of dropping, the reaction was continued at 150°C for 10 hours. The infrared absorption spectrum of the product after the completion of the reaction showed that the absorption of an isocyanate group (2260 cm$^{-1}$) disappeared and a new absorption of oxazolidone appeared at 1750 cm$^{-1}$. Also, a small amount of the absorption of an epoxy group (900 cm$^{-1}$) remained.

Referential Example 6

Into a 100 ml flask were charged 21.4 g (0.05 mole) of the diepoxide MH-8, 11.7 g (0.025 mole) of an isocyanate obtained by masking MDI with phenol (MS-50 manufactured by Nippon Polyurethane Co., in Japan), 33 g of m-cresol and 0.04 g of tetraethylammonium bromide. The mixture was heated to 150°C with stirring. The reaction was continued at 150°C for 20 hours to yield a viscous liquid. The infrared absorption spectrum of the reaction product showed the presence of the absorption of oxazolidone at 1750 cm$^{-1}$ and the absorption of an epoxy group at 900 cm$^{-1}$.

Referential Example 7

Into a 1 l flask equipped with a thermometer, a stirrer, a gas inlet tube, a reflux condenser and a dropping funnel was charged 155 g (0.5 mole) of diglycidylether of tetrahydrophthalic acid (XB-2610 manufactured by CIBA in Switzerland). The mixture was heated to 160°C while nitrogen gas was introduced, and a mixture of 70 g (0.4 mole) of TDI (tolylene diisocyanate) and 1.5 g of benzalkonium chloride was dropped through the dropping funnel. After the completion of dropping, the reaction was continued at 160°C for 2 hours and the reaction mixture was then cooled to room temperature to obtain a yellowish brown solid. The infrared absorption spectrum of the reaction product showed that the absorption of an isocyanate group (2260 cm$^{-1}$) disappeared, a strong absorption of oxazolidone appeared at 1750 cm$^{-1}$ and the absorption of an epoxy group (905 cm$^{-1}$) remained. It means that the reaction was completely finished and an oxazolidone bond was formed.

The following examples illustrate the present invention in more detail.

EXAMPLES 1 – 7

The flexibility of the cured resins according to the present invention obtained by combining the oxazolidones produced in the above-mentioned Referential Examples 1–7 and MDI as an isocyanate was compared with the flexibility of a cured resin consisting of DER-332 as a conventional epoxide and MDI.

Blending was carried out in a molar ratio of epoxy group to isocyanate group of 1:1. Thereto was added 1% of 2-phenylimidazole as a curing catalyst. The mixture was dissolved in m-cresol to prepare a varnish having a solid content of 50%. The varnish was applied onto a copper plate of 0.35 mm in thickness and then baked at 150°C for 15 hours to prepare a test piece. The resulting test piece was subjected to mandrel test. Also, in order to investigate thermal resistance, mandrel test after heat deterioration at 180°C for 24 hours was carried out. The results obtained are shown in Table 1.

Table 1

| | Starting materials used in varnish | | Diameter in which cracking occurred (inches) | |
|---|---|---|---|---|
| | Epoxide | Iso-cyanate | After baking | After heating at 180°C for 24 hours |
| 1 | DER-332 | MDI | 3/4 | 1 |
| 2 | Product of Example 1 | " | <1/8 | <1/8 |
| 3 | Product of Example 2 | " | 1/4 | 5/16 |
| 4 | Product of Example 3 | " | 1/4 | 1/4 |
| 5 | Product of Example 4 | " | 3/8 | 5/16 |
| 6 | Product of Example 5 | " | <1/8 | <1/8 |
| 7 | Product of Example 6 | " | <1/8 | <1/8 |
| 8 | Product of Example 7 | " | <1/8 | <1/8 |

As is clear from Table 1, the flexibility of the semi-cured resins and the thermal resistance of the cured resins obtained by using a polyoxazolidone terminated by two vicinal epoxy groups according to the present invention were excellent.

EXAMPLE 8

The polyoxazolidone obtained in Referential Example 1 and a tolylene diisocyanate-trimethylolpropane adduct (Suprasec 5250 manufactured by Imperial Chemical Industries, Ltd. in U.K.) were blended in different equivalent ratios of isocyanate group to epoxy group as described in Table 2 and 0.5% by weight of N-methylmorpholine was added. The resulting coating composition was applied onto a polyvinyl formal magnet wire of 2 mm in diameter (PVF manufactured by Hitachi Wire & Cable, Ltd. in Japan) and then heated at 200°C for 6 minutes to bake into a semi-cured state. Thus, self-bonding magnet wires were prepared. The flexibilities of the magnet wires were measured. The results obtained are shown in Table 2.

Also, two self-bonding magnet wires were contacted with each other and then heated at 150°C for 15 hours. The adhesive strength at room temperature was measured.

Table 2

| Equivalent ratio of isocyanate group to epoxy group | Diameter* in which cracking occurred (inches) | Adhesive** strength (kg/cm$^2$) |
|---|---|---|
| 1 | 1 | 20 |
| 2 | 7/16 | 60 |

Table 2-continued

| Equivalent ratio of isocyanate group to epoxy group | Diameter* in which cracking occurred (inches) | Adhesive** strength (kg/cm²) |
|---|---|---|
| 2.6 | <1/8 | 87 |
| 5 | <1/8 | 118 |
| 10 | <1/8 | 95 |
| 15 | <5/16 | 65 |
| 20 | <3/8 | 61 |

*Flexibility at a semi-cured state
**Adhesive strength after heating adhesion

It is important that cracking does not occur since cracking occurs also in the underlying insulating layer if cracking occurs in the self-welding layer of a magnet wire.

What is claimed is:

1. A process for producing a thermosetting resin which comprises blending 1 equivalent of a polyoxazolidone prepolymer terminated by two vicinal epoxy groups and containing at least two oxazolidone rings with at least 1 equivalent of a polyfunctional isocyanate compound, adding 0.01 to 10% by weight of a catalyst which forms isocyanurate rings and oxazolidone rings based on the total amount of the polyoxazolidone prepolymer and the isocyanate compound, and then heating to polymerize the resultant composition by forming isocyanurate rings and oxazolidone rings.

2. A process for producing a thermosetting resin which comprises blending 1 equivalent of a polyoxazolidone prepolymer terminated by two vicinal epoxy groups and containing at least two oxazolidone rings with at least 1 equivalent of a bifunctional isocyanate compound, adding 0.01 to 10% by weight of a catalyst which forms isocyanurate rings and oxazolidone rings based on the total amount of the polyoxazolidone prepolymer and the isocyanate compound, and then heating to polymerize the resultant composition by forming isocyanurate rings and oxazolidone rings.

3. A process according to claim 1, wherein 1 equivalent of the polyoxazolidone prepolymer is blended with 1 to 20 equivalents of the polyfunctional isocyanate compound.

4. A process according to claim 1, wherein 1 equivalent of the polyoxazolidone prepolymer is blended with 1 to 10 equivalents of the polyfunctional compound.

5. A process according to claim 1, wherein the polyoxazolidone prepolymer is terminated by two vicinal epoxy groups and contains 2 to 50 oxazolidone rings.

6. A process for producing a thermosetting resin which comprises blending 1 equivalent of a polyoxazolidone prepolymer terminated by two vicinal epoxy groups and containing at least two oxazolidone rings with at least 1 equivalent of a polyfunctional isocyanate compound, adding 0.01 to 10% by weight of a catalyst which forms isocyanurate rings and oxazolidone rings based on the total amount of the polyoxazolidone prepolymer and the isocyanate compound, and heating the resultant composition to cause (a) formation of isocyanurate rings by effecting trimerization of said isocyanate compound and thereafter (b) polymerization of the composition by formation of oxazolidone rings.

7. A process for producing a thermosetting resin which comprises blending 1 equivalent of a polyoxazolidone prepolymer terminated by two vicinal epoxy groups and containing at least two oxazolidone rings with at least 1 equivalent of a bifunctional isocyanate compound, adding 0.01 to 10% by weight of a catalyst which forms isocyanurate rings and oxazolidone rings based on the total amount of the polyoxazolidone prepolymer and the isocyanate compound, and heating the resultant composition to cause formation of isocyanurate rings by effecting trimerization of said isocyanate compound and thereafter (b) polymerization of the composition by formation of oxazolidone rings.

8. A process according to claim 6, wherein 1 equivalent of the polyoxazolidone is blended with 1 to 20 equivalents of the polyfunctional isocyanate compound.

9. A process according to claim 6, wherein 1 equivalent of the polyoxazolidone prepolymer is blended with 1 to 10 equivalents of the polyfunctional isocyanate compound.

10. A process according to claim 6, wherein the polyoxazolidone prepolymer is prepolymer is terminated by two vicinal epoxy groups and contains 2 to 50 oxazolidone rings.

11. A process according to claim 1, wherein said catalyst is selected from the group consisting of tertiary amines, N-substituted morpholine derivatives having alkyl, alkaryl, aralkyl, cyano-alkylene or morpholinoalkylene as a substituent, quaternary ammonium salts having a long chain alkyl of 8 or more carbon atoms and imidazole derivatives having alkyl cyano-alkylene or triazinoalkylene at any one of 1-, 2- and 4-positions.

12. A process according to claim 11, wherein said catalyst is selected from the group consisting of tertiary amines, N-allyldodecyl morpholine, butylene dimorpholine, hexamethylene dimorpholine, cyanoethyl morpholine, triazino-ethyl morpholine, N-methyl morpholine, and N-ethyl morpholine.

13. A process according to claim 6, wherein said catalyst is selected from the group consisting of tertiary amines, N-substituted morpholine derivatives having alkyl, arkaryl, aralkyl, cyano-alkylene or morpholinoalkylene as a substituent, quaternary ammonium salts having a long chain alkyl of 8 or more carbon atoms and imidazole derivatives having alkyl cyano-alkylene or triazinoalkylene at any one of 1-, 2- and 4-positions.

14. A process according to claim 13 wherein said catalyst is selected from the group consisting of tertiary amines, N-allyldodecyl morpholine, butylene dimorpholine, hexamethylene dimorpholine, cyanoethyl morpholine, triazino-ethyl morpholine, N-methyl morpholine, and N-ethyl morpholine.

15. A process according to claim 1, wherein said catalyst is such that trimerization of the isocyanate compounds precedes the formation of oxazolidone rings.

16. A process according to claim 2, wherein said catalyst is such that trimerization of the isocyanate compounds precedes the formation of oxazolidone rings.

17. A process according to claim 6, wherein said catalyst is such that trimerization of the isocyanate compounds precedes the formation of oxazolidone rings.

18. A process according to claim 7, wherein said catalyst is such that trimerization of the isocyanate compounds precedes the formation of oxazolidone rings.

19. A process according to claim 11, wherein said diepoxide and said diisocyanate are reacted at 100° to 200°C. for about 0.1 to 10 hours in the presence of 0.1 to 10 parts by weight per 100 parts by weight of the mixture of the diepoxide and diisocyanate of said lithium butoxide or quaternary ammonium salt.

* * * * *